United States Patent [19]

Viegas et al.

[11] Patent Number: 5,267,446

[45] Date of Patent: Dec. 7, 1993

[54] AIR CONDITIONING AND REFRIGERATION SYSTEMS UTILIZING A CRYOGEN

[75] Inventors: Herman H. Viegas, Bloomington, Minn.; Roland L. Roehrich, Pittsburgh, Pa.

[73] Assignee: Thermo King Corp., Minneapolis, Minn.

[21] Appl. No.: 982,333

[22] Filed: Nov. 27, 1992

[51] Int. Cl.$^5$ .............................................. F17C 9/02
[52] U.S. Cl. ........................................ 62/50.2; 62/167; 62/239
[58] Field of Search .................... 62/50.2, 167, 239

[56] References Cited

U.S. PATENT DOCUMENTS

| | | |
|---|---|---|
| 3,121,999 | 2/1964 | Kasbohm et al. ............... 62/50.3 |
| 3,802,212 | 4/1974 | Martin et al. . |
| 4,045,972 | 9/1977 | Tyree, Jr. . |
| 4,100,759 | 7/1978 | Tyree, Jr. . |
| 4,186,562 | 2/1980 | Tyree, Jr. . |
| 4,321,796 | 3/1982 | Kohno ........................... 62/50.2 |
| 4,348,873 | 9/1982 | Yamauchi et al. ............... 62/50.2 |
| 4,498,306 | 2/1985 | Tyree, Jr. . |
| 5,040,374 | 8/1991 | Micheau . |
| 5,069,039 | 12/1991 | Martin . |
| 5,090,209 | 2/1992 | Martin . |

*Primary Examiner*—Ronald C. Capossela
*Attorney, Agent, or Firm*—M. J. Moran

[57] ABSTRACT

Methods and apparatus for controlling the temperature of a conditioned space, including a supply of cryogen, and a fluid flow path for the cryogen which includes a heat exchanger. A heater is disposed to heat cryogen in the flow path in response to predetermined conditions, and a cryogen pre-heater is disposed to aid the heater. In a first embodiment, the pre-heater is aided by directing warm cryogen in heat exchange relation with cryogen flowing through the pre-heater, with the warm cryogen being taken from a point downstream from the heat exchanger. In another embodiment, the heater generates heated gases as a by-product, with the pre-heater being aided by directing the heated gases in heat exchange relation with cryogen flowing through the pre-heater.

40 Claims, 3 Drawing Sheets

AIR CONDITIONING AND REFRIGERATION SYSTEMS UTILIZING A CRYOGEN

TECHNICAL FIELD

The invention relates in general to air conditioning and refrigeration systems, and more specifically to the use of a cryogen for controlling the temperature of a conditioned space of stationary and transport type applications of air conditioning and refrigeration systems.

BACKGROUND ART

Stationary and transport applications of air conditioning and transport refrigeration systems control the temperature of a conditioned space to a predetermined temperature range adjacent to a predetermined set point temperature, with transport applications including those used with straight trucks, tractor-trailer combinations, refrigerated containers, and the like. Such air conditioning and refrigeration systems conventionally utilize a chlorofluorocarbon (CFC) refrigerant in a mechanical refrigeration cycle. The mechanical refrigeration cycle requires a refrigerant compressor driven by a prime mover, which often includes an internal combustion engine, such as a diesel engine. Because of the suspected depleting effect of CFC's on stratospheric ozone ($O_3$), practical alternatives to the use of CFC's in air conditioning and refrigeration systems are being sought.

The use of a cryogen, i.e., a gas which has been compressed to a very cold liquid state, such as carbon dioxide ($CO_2$) and nitrogen ($N_2$), in air conditioning and refrigeration systems is particularly attractive because, in addition to eliminating the need for a CFC, it also eliminates the need for a compressor and associated prime mover.

Thus, it would be desirable, and it is an object of the present invention, to provide reliable, practical methods and apparatus which utilize a cryogen in air conditioning and refrigeration systems.

SUMMARY OF THE INVENTION

The invention includes methods and apparatus for controlling the temperature of a conditioned space using a cryogen, such as nitrogen ($N_2$) or carbon dioxide ($CO_2$), via cooling and heating cycles, as required to achieve and hold a predetermined narrow temperature band adjacent to a selected set point temperature.

The methods of the invention include conditioning the air of a conditioned space comprising the steps of providing a supply of cryogen which includes cryogen in a liquid state, providing a fluid flow path for the cryogen, providing heat exchanger means in the flow path, moving air from the conditioned space in heat exchange relation with the heat exchanger means, providing heating means in the flow path, heating the cryogen via the heating means in response to a predetermined condition, providing cryogen pre-heating means, vaporizing liquid cryogen via the cryogen pre-heating means to aid the heating step in adding heat to the cryogen, and using cryogen heated by the heating step to aid the pre-heating step in response to a predetermined condition.

In one embodiment of the invention a method of controlling the temperature of a conditioned space includes the steps of measuring the temperature of the cryogen downstream from the heat exchanger means to provide a first temperature, measuring the ambient temperature to provide a second temperature, and comparing the first and second temperatures, with a predetermined condition which triggers the use of heated cryogen to aid the vaporizing step being the first temperature exceeding the second temperature. This embodiment further includes the step of using ambient air to aid the pre-heating step when the first temperature does not exceed the second temperature.

In another embodiment of the invention, the step of providing the cryogen heating means in the flow path, provides heating means which generates heated gases as a by-product. Instead of using heated cryogen to aid the pre-heating step, the heated gases from the heating means are utilized.

The apparatus of the invention includes a refrigeration system for conditioning the air of a conditioned space, including a supply of cryogen, a fluid flow path for the cryogen, heat exchanger means in the flow path, means moving air from the conditioned space in heat exchange relation with the heat exchanger means, heating means in the flow path for heating the cryogen in response to a predetermined condition, cryogen pre-heating means for aiding the heating means, and means responsive to a predetermined condition for directing cryogen heated by the heating means in heat exchange relation with cryogen flowing through the pre-heating means, to aid the pre-heating means in adding heat to the cryogen.

In one embodiment of the invention, first sensor means measures the temperature of the cryogen downstream from the heat exchanger means to provide a first temperature, second sensor means measures the ambient temperature to provide a second temperature, and comparison means compares the first and second temperatures. A predetermined condition which triggers the use of heated cryogen to aid the pre-heating means includes the comparison means finding that the first temperature exceeds the second temperature. When the comparison means finds the first temperature does not exceed the second temperature, means is provided for directing ambient air in heat exchange relation with the cryogen flowing through the pre-heating means.

In another embodiment of the invention, the heating means generates heated gases as a by-product, with the heated gases being used to aid the pre-heating means in adding heat to the cryogen, instead of the heated cryogen.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

As used in the following description and claims, the term "conditioned space" includes any space to be temperature and/or humidity controlled, including stationary and transport applications for the preservation of foods and other perishables, maintenance of a proper atmosphere for the shipment of industrial products, space conditioning for human comfort, and the like. The term "refrigeration system" is used to generically cover both air conditioning systems for human comfort, and refrigeration systems for preservation of perishables and shipment of industrial products. Also, when it is stated that the temperature of a conditioned space is controlled to a selected set point temperature, it is to be understood that the temperature of the conditioned space is controlled to a predetermined temperature range adjacent to the selected set point temperature. In the Figures, valves which are normally open (n.o.), are illustrated with an empty circle, and valves which are normally closed (n.c.) are illustrated with an "X" within a circle. Of course, the associated electrical or electronic control, hereinafter called "electrical control", may be changed to reverse the deenergized states shown. An arrow pointed at a valve in the Figures indicates that the valve is, or may be, controlled by the electrical control.

The invention is suitable for use when a refrigeration system is associated with a single conditioned space to be controlled to a selected set point temperature; and, the invention is also suitable for use when a refrigeration system is associated with a compartmentalized application, i.e., a conditioned space is divided into at least first and second separate conditioned spaces to be individually controlled to selected set point temperatures. In a compartmentalized application, for example, one conditioned space may be used to condition a frozen load, and the other a fresh load, or combinations thereof, as desired.

Figure 1:
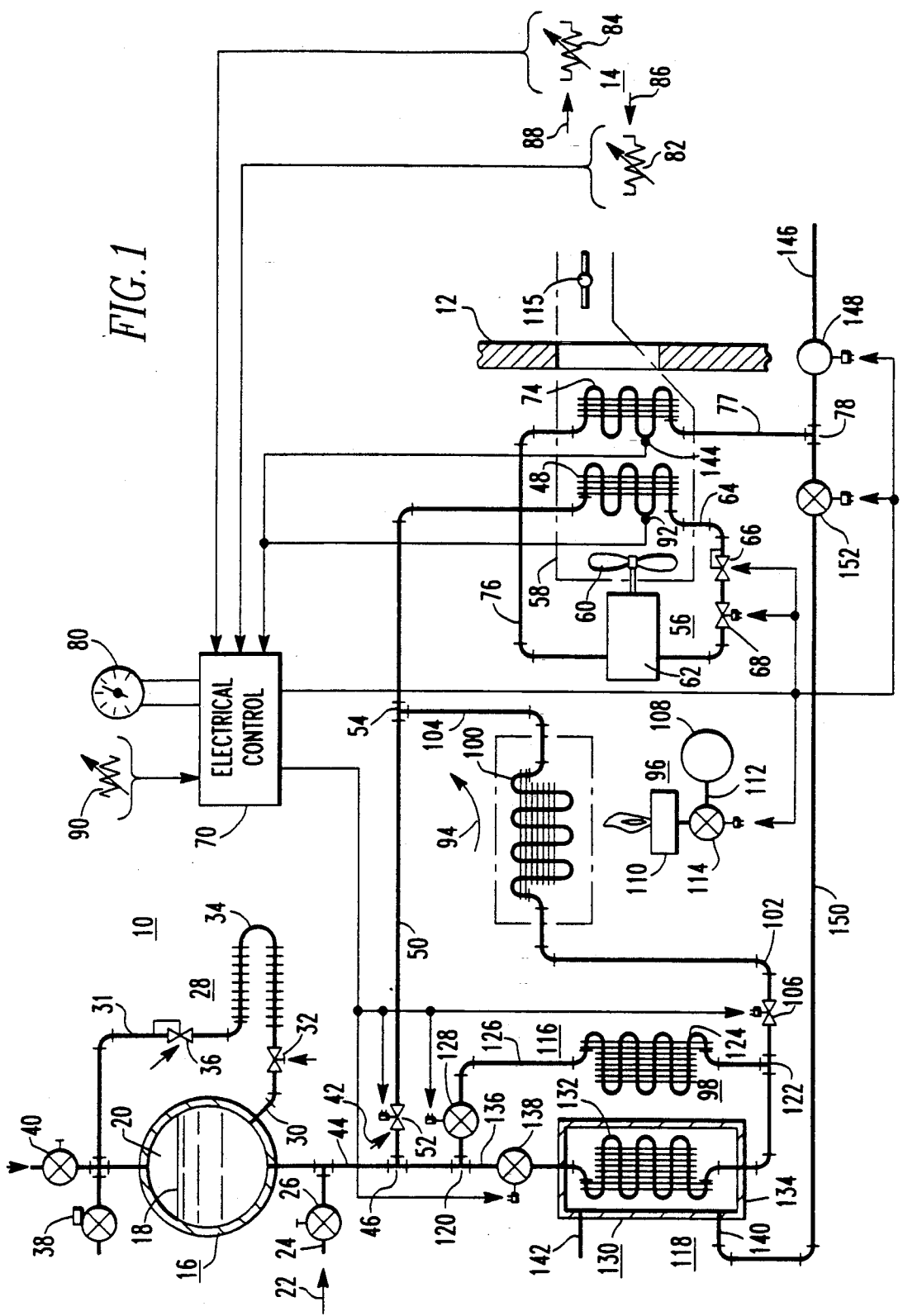
FIG. 1 is a diagrammatic representation of a refrigeration system constructed according to the teachings of the invention wherein a heating cycle is enhanced by utilizing heated cryogen to aid cryogen pre-heating apparatus, when the temperature of the heated cryogen exceeds ambient temperature.

Referring now to the drawings, and to FIG. 1 in particular, there is shown a refrigeration system 10 suitable for use with any conditioned space, and particularly well suited for use on straight trucks, tractortrailer combinations, containers, and the like, with the word "vehicle" being used to generically refer to the various transport vehicles which utilize refrigeration systems.

Refrigeration system 10 may be used in stationary and transport applications, with reference 12 generally indicating a vehicle in a transport application, and an enclosure wall in a stationary application. Refrigeration system 10 may be used to condition a single conditioned space 14 to be conditioned to a predetermined set point temperature, and also to condition two or more separate conditioned spaces to selected set point temperatures. For purposes of example only, the embodiments of the invention set forth in the Figures illustrate refrigeration system 10 controlling the temperature of a single conditioned space 14.

More specifically, refrigeration system 10 includes a vessel 16 containing a suitable cryogen, such as nitrogen ($N_2$), or carbon dioxide ($CO_2$), for example, with a liquid phase thereof being indicated at 18, and with a vapor phase, located above the liquid level, being indicated at 20. Vessel 16 may be filled, for example, by connecting a ground support apparatus, indicated generally at 22, to a supply line or conduit 24 which includes a valve 26.

Vapor pressure in vessel 16 is maintained above a predetermined pressure by a pressure regulating arrangement 28 connected between lower and upper points of vessel 16 via conduits 30 and 31, respectively. When the cryogen used is $CO_2$, for example, the pressure in vessel 16 must be maintained above the triple point for $CO_2$, i.e., 75.13 psia. A valve 32, a vaporizing coil 34, and a valve 36 are connected between conduits 30 and 31. Valve 32 opens when the pressure in vessel 16 falls to a predetermined value, admitting liquid cryogen into vaporizing coil 34. Vaporizing coil 34 is exposed to ambient temperature outside of vehicle 12. Pressure regulating valve 36 maintains the vapor pressure in vessel 16 at a predetermined level selected for optimal system operation and/or to prevent the formation of $CO_2$ slush in vessel 16 when the cryogen is $CO_2$.

A pressure reading safety valve 38 is provided in conduit 30 at a point where the vapor pressure in vessel 16 may be directly sensed. A venting valve 40 is also provided to facilitate the filling process. Using $CO_2$ as an example for the cryogen, vessel 16 may be filled with $CO_2$ at an initial pressure of about 100 psia and an initial temperature of about $-58°$ F. ($-50°$ C.). Of course, other pressures and temperatures may be used than in this example, such as an initial pressure of about 300 psia and an initial temperature of about $0°$ F. ($-17.8°$ C.).

A first cryogen fluid flow path 42 is provided which draws liquid cryogen 18 from vessel 16 via a conduit 44. Conduit 44 extends from a low point of vessel 16 to a tee 46. The first flow path 42 continues from tee 46 to a first heat exchanger 48 via a conduit 50 which includes a flow regulating valve 52 and a tee 54. The first flow path 42 continues from the first heat exchanger 48 to air mover means 56. Air mover means 56 draws air from conditioned space 14 into an air conditioning means or apparatus 58, which includes the first heat exchanger 48. Conditioned air is discharged back into conditioned space 14 by air mover means 56. Air mover means 56 includes a fan or blower 60 which is driven by vaporized cryogen in a suitable vapor driven motor or turbine 62, which will hereinafter be referred to as vapor driven motor 62.

The first heat exchanger 48 is dimensioned and configured, and the flow rate of the cryogen adjusted via flow regulating valve 52, to completely vaporize the liquid cryogen 18, and thus vaporized cryogen is provided at an exit end of heat exchanger 48. The first flow path 42 continues from heat exchanger 48 to an input of vapor driven motor 62 via a conduit 64 which includes a back pressure regulating valve 66 and an expansion valve 68. Expansion valve 68, which isenthalpically expands the vaporized cryogen before being directed to the vapor operated motor 62, may have a manually adjustable orifice, or the orifice size may be controlled by electrical control 70. Vapor driven motor 62 isentropically expands the vaporized cryogen, driving fan 60 while reducing the pressure and temperature of the cryogen.

An output of vapor driven motor 62 is connected to a second heat exchanger 74 associated with air conditioning apparatus 58 via a conduit 76, continuing the first flow path 42. The first flow path 42 then continues from the output of the second heat exchanger 74 via a conduit 77 to a tee 78. In a compartmentalized application, the second heat exchanger 74 could be associated with a second conditioned space having a set point temperature above the set point temperature of conditioned space 14, for example.

The first flow path 42 to this point of the description may provide a cooling cycle for conditioned space 14, when the temperature of conditioned space 14 is above a predetermined narrow temperature band relative to a set point temperature selected via a set point temperature selector 80. Flow regulating feed valve 52 is controlled by electrical control 70 as a function of system conditions at any instant. For example, flow regulating valve 52 may be controlled as a function of the desired set point temperature, the actual temperature of conditioned space 14, and the ambient temperature.

The temperature of conditioned space 14 is sensed by either, or both, return air and discharge air temperature sensors 82 and 84. Temperature sensor 82 senses the temperature of air returning to the air conditioning apparatus 58, with the return air being indicated by arrow 86. Temperature sensor 84 senses the temperature of air being discharged from air conditioning apparatus 58, with the discharge air being indicated by arrow 88. The temperature of the ambient air is sensed by an ambient air temperature sensor 90. The conditioned air 88, which results from the heat exchange relation between the return air 86 and heat exchangers 48 and 74, is discharged back into conditioned space 14.

Air from conditioned space 14 does not mix with cryogen at any point in the refrigeration systems of the invention. Thus, there is never any contamination of conditioned space 14 with cryogen. Refrigeration system 10 may be used in combination with arrangements which do inject $CO_2$ into a conditioned space for fast temperature pull down and/or for load preservation. In such combined applications vessel 16 may be used as the source of the $CO_2$.

A temperature sensor 92 is disposed to sense the surface temperature of heat exchanger 48 at a location at or near the exit end of heat exchanger 48 to detect when evaporation may not be 100%, such as when surface ice builds up on heat exchanger 48. Thus, temperature sensor may be used to enable electrical control 70 to trigger a defrost mode or cycle.

Electrical control 70 subtracts the temperature of conditioned space 14, as indicated by the return air sensor 82, for example, from the set point temperature selected via set point selector 80, to provide a $\Delta T$ which is negative when the temperature of the conditioned space 14 is above set point, and positive when it is below set point. A negative $\Delta T$ triggers a cooling cycle, which results in controlling the flow of liquid cryogen 18 from vessel 16 through the first flow path 42 which includes the first and second heat exchangers 48 and 74.

A positive $\Delta T$ triggers a heating cycle, and, as just mentioned, a heating cycle may also be triggered by defrost sensing means, such as the coil temperature sensor 92, or a timer, to melt water ice which may build up on heat exchangers 48 and 74 during a cooling cycle. In the embodiment of FIG. 1, a heating cycle is implemented by a second cryogen flow path 94 which is connected between tees 46 and 54. The second cryogen flow path 94 includes cryogen heating means 96 and cryogen pre-heating means 98.

Cryogen heating means 96 includes a heat exchanger coil 100 connected in the second cryogen flow path 94 via conduits 102 and 104, with conduit 102 connecting heat exchanger coil 100 to the cryogen pre-heating means 98 via a flow regulating valve 106, and with conduit 104 connecting heat exchanger coil 100 to tee 54. Heating means 96 includes a fuel supply 108 connected to a burner 110 via a conduit 112 which includes a valve 114. The fuel from fuel supply 108, for example, may include liquefied natural gas, propane, diesel fuel, and the like. In a stationary application, other heat sources may be used to heat the cryogen, including electrical, hot liquids, steam, waste gases, and the like. When a heating cycle is required to achieve and hold the set point temperature, or to defrost heat exchangers 48 and 74, control 70 opens valve 114, while simultaneously igniting burner 110. A controllable defrost damper 115 may be provided, with damper 115 being closed during a defrost cycle, to prevent warm air from being discharged into conditioned space 14.

Preheating means 98, in this embodiment of the invention, includes first and selectable parallel flow paths 116 and 118, connected between tees 120 and 122. Tee 120 is connected to the first flow path 42 at tee 46, and tee 122 is connected to heating means 96. The first parallel flow path 116 includes an ambient loop 124 connected between tees 120 and 122 via a conduit 126 which includes a valve 128. Ambient loop 124 is disposed to expose any cryogen flowing therethrough to the ambient temperature, pre-heating the liquid cryogen 18 and vaporizing at least a portion thereof, before the cryogen reaches heating means 96.

The second parallel flow path 118 includes heat exchanger means 130 disposed outside conditioned space 14, with heat exchanger means 130 comprising a heat exchanger coil 132 surrounded by a housing 134. Heat exchanger coil 132 is connected between tees 120 and 122 via a conduit 136 which includes a valve 138. Housing 134 includes an input 140 and an output 142.

Pre-heating means 98 is provided in order to conserve as much of the fuel supply 108 during a heating cycle as possible, with it being common to provide an ambient loop 124 for pre-heating cryogen prior to heating cryogen with fuel burned in a burner 110. There are many instances in the winter when the ambient temperature provides very little pre-heating. The heated cryogen in a heating cycle, even after traversing both the first and second heat exchangers 48 and 74, is often well above freezing, with the temperature depending upon the temperature of the conditioned space 14. The present invention utilizes the heated cryogen, after it has traversed heat exchangers 48 and 74, to aid the pre-heating means 98 in adding heat to the cryogen, when the temperature of the cryogen at this point of the flow path exceeds the ambient temperature.

More specifically, a temperature sensor 144 is disposed to sense the temperature of the cryogen as it exits the second heat exchanger 74, providing this information for electrical control 70, which then compares the temperature sensed by sensor 144 with the ambient temperature sensed by ambient temperature sensor 90. When the temperature of the ambient air exceeds the temperature of the cryogen exiting the second heat exchanger 74, control 70, during a heating cycle, opens valve 128 to direct liquid cryogen 18 through the first parallel path 116. When the temperature of the ambient air is less than the temperature of the cryogen exiting the second heat exchanger 74, electrical control 70 opens valve 138 to direct liquid cryogen 18 through heat exchanger coil 132.

The cryogen exiting the second heat exchanger 74 is connected to tee 78 via conduit 77, with one side of tee 78 being connected to an exhaust conduit 146 via a valve 148. The remaining side of tee 78 is connected to the input 140 of heat exchanger housing 130 via a conduit 150 which includes a valve 152. Thus, during a heating cycle to achieve set point, or a heating cycle initiated to defrost heat exchangers 48 and 74, when electrical control 70 determines that the temperature of the cryogen exiting the second heat exchanger 74 is higher than the ambient temperature, control 70 closes valve 148 and opens valves 138 and 152, to allow cryogen, which would normally be exhausted to the atmosphere, to aid the pre-heating means 98.

At the start of a heating or defrost cycle, the temperature of the cryogen exiting the second heat exchanger 74 may be lower than the ambient temperature, and thus ambient loop 124 would be initially selected to perform the pre-heating. As the cryogen heats up during the same heating cycle, or defrost cycle, a point may be reached where the temperature of the exiting cryogen exceeds ambient temperature. Control 70 would then close valves 128 and 148, and open valve 138, to switch the cryogen pre-heat arrangement from path 116 to path 118, to utilize heated cryogen to perform the pre-heating.

Figure 2:
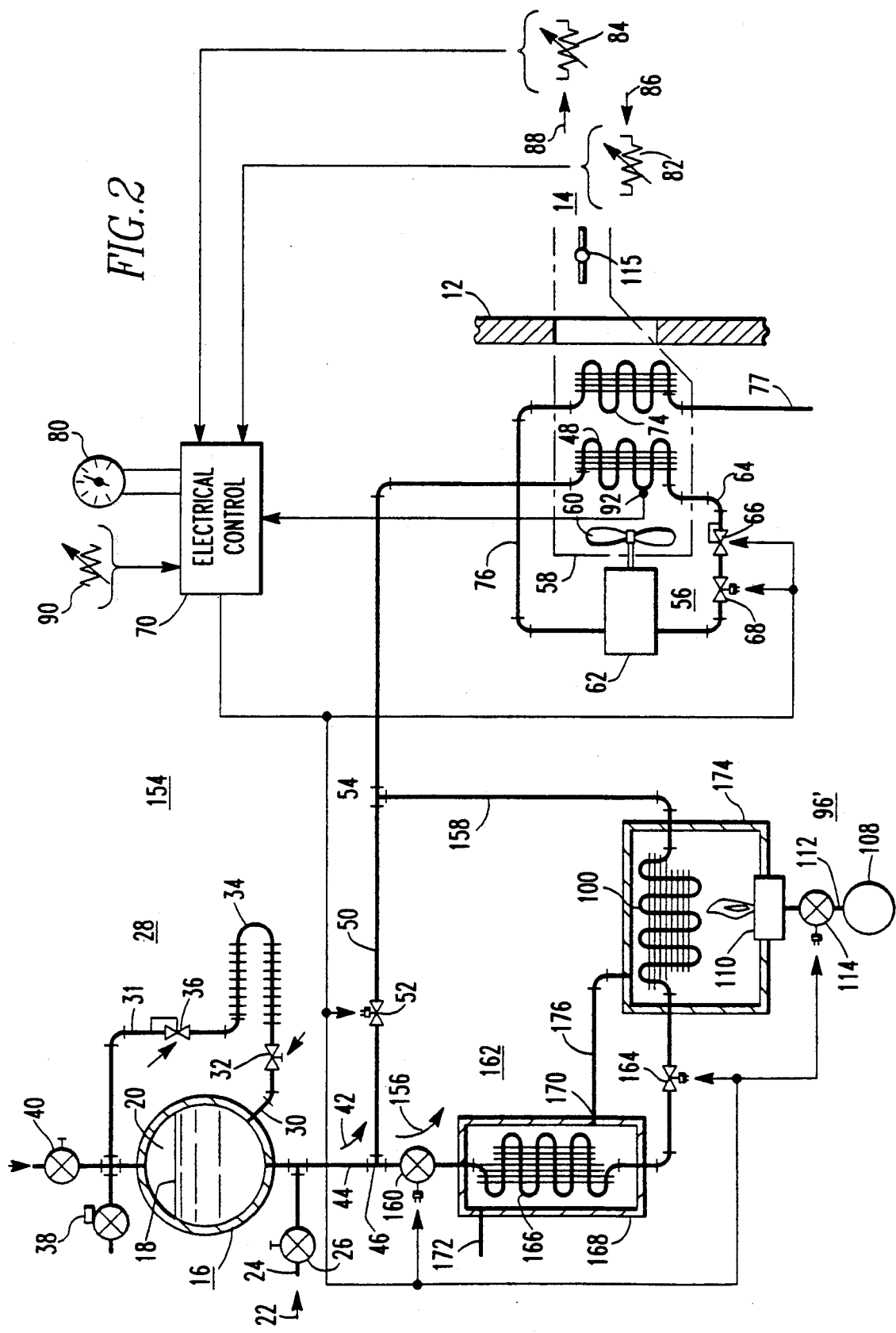
FIG. 2 is a diagrammatic representation of a refrigeration system constructed according to another embodiment of the invention wherein a heating cycle is enhanced by utilizing heated gases from cryogen heating apparatus to aid cryogen pre-heating apparatus.

FIG. 2 is a diagrammatic representation of a refrigeration system 154 which differs from refrigeration system 10 in the manner in which the pre-heating and heating arrangements between tees 46 and 54 are constructed. Instead of using cryogen in the pre-heat arrangement when the cryogen exhaust temperature exceeds ambient temperature, the embodiment of FIG. 2 utilizes heated gases for aiding pre-heat which are a by-product of the heating means 96. Like components in FIGS. 1 and 2 are identified with like reference numbers and will not be described again.

More specifically, in FIG. 2 a second cryogen flow path 156 is connected between tees 46 and 54, including a conduit 158 which includes a valve 160, cryogen pre-heating means 162, a flow regulating valve 164, and heating means 96'. Pre-heating means 162 includes a heat exchanger coil 166, through which liquid cryogen to be vaporized flows, and a pre-heater housing 168 which surrounds heat exchanger coil 166. Housing 168 has an input conduit 170 and an exhaust conduit 172. Heating means 96' is similar to the heating means 96 of FIG. 1, except a housing 174 disposed about heat exchanger coil 100 includes an exhaust conduit 176 connected to the input conduit 170 of the preheater housing 168. The hot gases exhausted from housing 174 which result from the burning of fuel in burner 110 will always be much warmer than the ambient temperature, and thus an ambient heating arrangement is not required. Also, since the ΔT in the pre-heating arrangement will always be much higher when combustion exhaust gases are used, heat exchanger coil 166 may be much smaller than preheat coils 124 and 132 of the FIG. 1 embodiment. Thus, pre-heat coil 166 will require less mounting space.

When control 70 switches to a heating cycle for defrost or for conditioned space heating purposes, valve 52 is closed and valves 160 and 114 are opened. Burner 110 will be automatically ignited and hot gases therefrom will immediately be directed to surround pre-heat coil 166, vaporizing and in some cases superheating the liquid cryogen 18. Thus, less fuel from supply 108 is required to raise the temperature of the vaporized cryogen to the desired value via heating means 96'.

In the embodiments of FIGS. 1 and 2, cryogen flow through the air mover means 56 is determined by the amount of cryogen flowing through the heat exchangers 48 and 74 at any instant. When the temperature of conditioned space 14 is at the desired set point temperature, if the conditioned load in conditioned space 14 is a fresh load, requiring continuous air circulation, control 70 could, as an option, cycle between cooling and heating cycles to maintain set point with air circulation; or, as will be hereinafter described, an independent flow path may be provided for vapor motor 62 which bypasses the heat exchangers to provide a null cycle with air flow.

Figure 3:
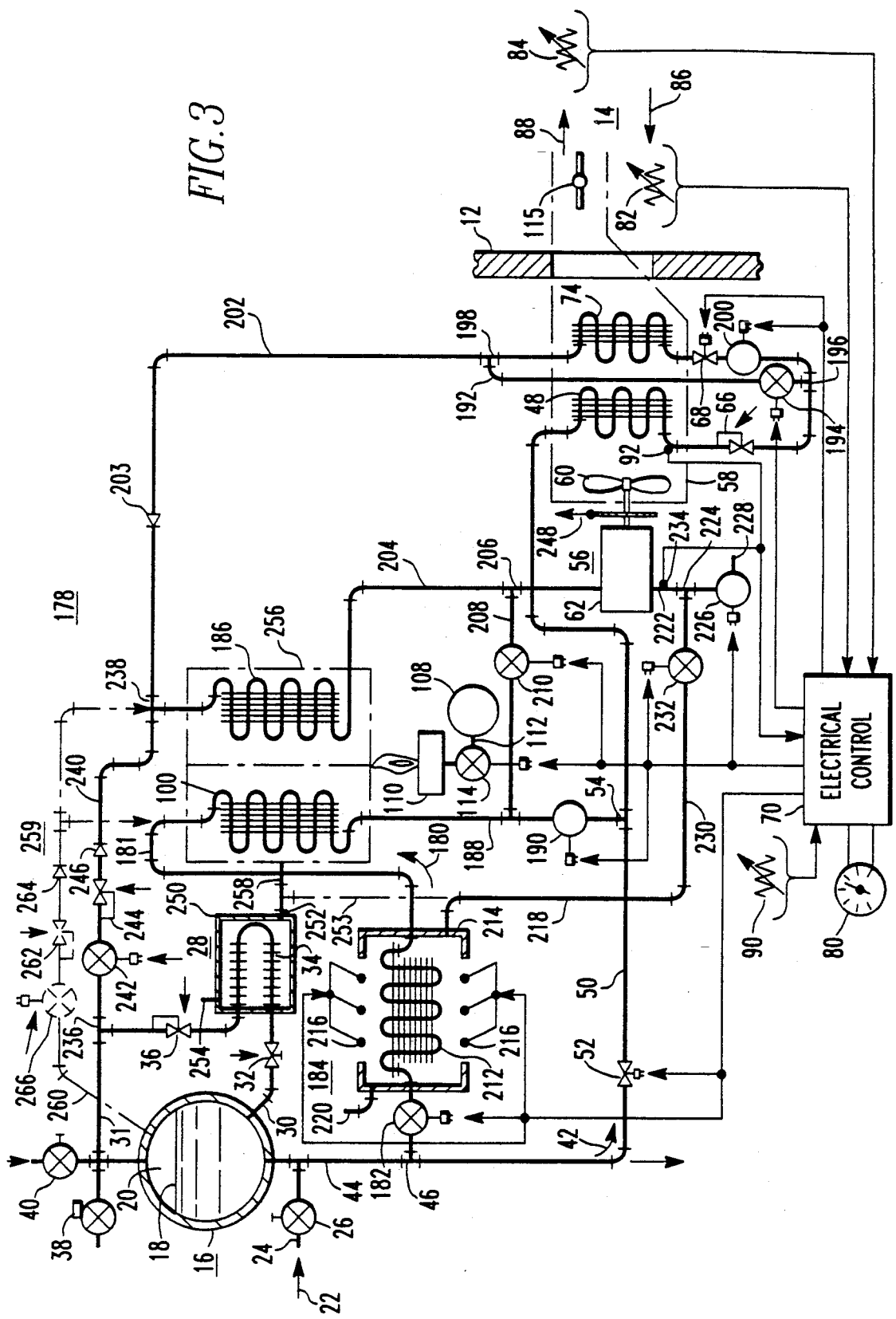
FIG. 3 is a diagrammatic representation of a refrigeration system illustrating an embodiment of the invention which utilizes heated cryogen to aid pre-heating apparatus during a heating cycle, similar to the embodiment of FIG. 1, except the heated cryogen is taken from a different point in the cryogen flow path, and a single preheating coil is used in the pre-heating apparatus, regardless of whether heated cryogen or ambient air is being used to aid the pre-heating apparatus.

FIG. 3 is a diagrammatic representation of a refrigeration system 178 which is similar to the refrigeration systems described and claimed in concurrently filed FIG. 3 illustrates an arrangement which provides independent control over the air mover means 56, providing any desired air movement volume in conditioned space 14 regardless of the amount of cryogen flowing through the heat exchangers 48 and 74. The illustrated arrangement also permits operation of air mover means 56 with zero flow of cryogen through the heat exchangers 48 and 74, permitting a null cycle to be initiated when the temperature of conditioned space 14 is "satisfied", i.e., requiring neither a cooling nor a heating cycle to hold the temperature of conditioned space 14 within a "null" temperature band adjacent to the selected set point temperature. FIG. 3 also illustrates an embodiment of the present invention which, similar to the FIG. 1 embodiment utilizes "spent" cryogen in a cryogen pre-heating arrangement, while combining the two preheating means 116 and 118 of the FIG. 1 embodiment.

More specifically, a second cryogen flow path 180, connected between tees 46 and 54 of the first cryogen flow path 42, comprises a conduit 181 which includes a valve 182, a pre-heating means 184, the heating means 96, which may identical to the pre-heating means of FIG. 1, or, as will be hereinafter explained, modified to include an additional heat exchanger coil 186, a tee 188, and a valve 190.

The air mover means 56 in this embodiment is moved to the end of the normal cryogen flow path, i.e., instead of being disposed between heat exchangers 48 and 74, air mover means 56 is moved downstream from the two heat exchangers, and heat exchangers 48 and 74 are connected together via the hereinbefore mentioned back pressure regulating valve 66 and expansion valve 68. In order to allow staging of the cooling and heating cycles, the second heat exchanger 74 may be selectively added to, and removed from, the cryogen flow path via a conduit 192, which includes a valve 194, and two tees 196 and 198 which are respectively located on the upstream and downstream sides of the second heat exchanger 74. A valve 200 is also provided between tee 196 and the input side of the second heat exchanger 74. Thus, electrical control 70 may operate both heat exchangers 48 and 74, or only heat exchanger 48, as dictated by the magnitude of ΔT.

Tee 198 on the downstream side of the second heat exchanger 74 is connected to the hereinbefore mentioned heat exchanger coil 186 via a conduit 202 and a check valve 203. Heat exchanger coil 186 may be heated by heating means 96, as illustrated, or by a separate burner and valve connected to fuel supply 108, as desired. The output of heat exchanger coil 186 is connected to the input of vapor motor 62 via a conduit 204, which includes a tee 206. A conduit 208 having a valve 210 interconnects tees 188 and 206.

The pre-heating means 184 includes an ambient loop or heat exchanger 212 surrounded by a housing 214. Housing 214 has two selectable configurations provided by controllable shutters 216. Heat exchanger coil 212 is located such that air flow may flow freely through housing 214, and about heat exchanger coil 212, when shutters 216 are open. When shutters 216 are closed, housing 214 defines a substantially closed structure surrounding heat exchanger coil 212, including an input conduit 218 and an exhaust conduit 220.

A normal exhaust conduit 222 exiting vapor motor 62 is modified to include a tee 224. One branch of tee 224 includes a valve 226 and an exhaust conduit 228, and the remaining branch of tee 224 is connected to the input conduit 218 of pre-heater housing 214 via a conduit 230 which includes a valve 232. The temperature of the cryogen exiting vapor motor 62 is sensed by a temperature sensor 234.

During a cooling cycle, valve 182 is closed and valve 52 controls the rate of liquid cryogen 18 flowing to the first heat exchanger 48. During initial temperature pull down of conditioned space 14, both heat exchangers 48 and 74 will normally be used. If the vapor entering vapor motor 62 does not have sufficient energy to provide the desire air flow rate in conditioned space 14, then energy may be added to the vapor by igniting burner 110 via control 70. As set point temperature is approached, valve 200 may be closed and valve 194 opened, to reduce the cooling rate of conditioned space 14 by removing the second heat exchanger 74 from the active cryogen flow path, while providing higher pressure cryogen for driving vapor motor 62.

When the temperature of conditioned space 14 enters a predetermined narrow temperature band adjacent to the selected set point temperature, a null cycle may be initiated which requires zero cryogen flow through heat exchangers 48 and 74. If the load in conditioned space 14 requires air circulation, valves 52 and 190 are closed, and valves 182, 210 and 114 are opened, directing heated cryogen directly to vapor motor 62 for independent operation thereof.

Electrical control 70 compares the temperature of the cryogen exiting vapor motor 62, as sensed by sensor 234, with the temperature of the ambient air, as sensed by sensor 90. Electrical control 70 opens shutters 216 and exhausts the cryogen to the atmosphere via valve 228 and exhaust conduit 228, when the ambient temperature is higher than the temperature of the cryogen. Electrical control 70 closes shutters 216 and directs the cryogen from vapor motor 62 to housing 214 by opening valve 232 and closing valve 226, when the temperature of the cryogen exceeds ambient temperature.

Should the temperature of conditioned space 14 fall out of the narrow temperature band or null zone adjacent to the selected set point temperature, and the load is a fresh load requiring a heating cycle, valve 210 is closed and valve 190 is opened, to direct the heated cryogen through the first heat exchanger 48, and optionally through the second heat exchanger 74. For example, the magnitude of the positive $\Delta T$ may be used to determine if one or both of the heat exchangers 48 and 74 should be active. The cryogen exiting tee 198 will be heated again if heat exchanger coil 186 is heated by heating means 96. If heat exchanger coil 186 is heated by a separate burner, electrical control 70 will make a decision as to whether the cryogen needs additional heat to provide the fan horsepower necessary to obtain the desired air flow in conditioned space 14. Control 70 continuously compares the temperature of the cryogen exiting vapor motor 62 with ambient temperature, pre-heating the cryogen with ambient air, or by the cryogen exiting vapor motor 62, whichever is warmer.

A defrost cycle to defrost heat exchangers 48 and 74 is similar to the heating cycle just described, except valve 200 would always be open and valve 194 would always be closed, to directly heat both heat exchangers 48 and 74 and thus minimize defrost time. Defrost damper 115 would also be closed during a defrost cycle. When defrost damper 115 is not provided, a valve arrangement located at the entrance of vapor motor 62 may be provided to divert the cryogen exiting heat exchanger 74 away from heat exchanger 86 and vapor motor 62 and into conduit 230, to simultaneously stop vapor motor 62 during the defrost cycle, and aid the pre-heat means 184.

Instead of providing independent fan control from the liquid side of vessel 16 via conduit 44, vaporized cryogen from conduit 31 may be used, as disclosed in the hereinbefore mentioned concurrently filed application Ser. No. 07/982,364. In such an embodiment, also disclosed in FIG. 3, conduits 31 and 202 may be provided with tees 236 and 238, respectively, and a conduit 240 connected therebetween which includes a valve 242, a pressure regulating valve 244, and a check valve 246.

When an increased air flow rate is required in conditioned space 14, such as detected by a motor speed sensing means 248 associated with vapor motor 62, e.g., a toothed wheel and associated sensor, the production of vaporized cryogen by vaporizing coil 34 may be enhanced by providing a housing 250 about coil 34 having inlet and outlets, and directing either warm expended cryogen to inlet 252, when cryogen exiting vapor motor 62 exceeds ambient temperature, or directing hot gases produced by burner 110 to inlet 252. In the first mentioned arrangement, conduit 230 may be connected to inlet 252 via a conduit 253, shown in phantom, and in the latter arrangement a housing 256 is provided to collect hot gases from burner 110, and a conduit 258 is connected from housing 256 to inlet 252 of housing 250.

In very cold ambient temperatures, e.g., below 0° F. ($-17.8°$ C.), pressure build-up coil 34 may not be able to maintain the desired pressure in vessel 16. In such a case, warmer exhaust cryogen or combustion gases may be used to assist pressure build-up coil 34 to build up to, and maintain, the desired pressure.

During the operation of refrigeration system 10 in a cooling cycle, it is necessary to maintain the pressure of the cryogen in the flow paths above a predetermined value. Pressure regulators may be located at strategic locations in the flow paths; and/or the vapor pressure in vessel 16 may be used to maintain the pressure in the cryogen flow paths above a predetermined value, which for $CO_2$ is above the triple point thereof. A pressure maintaining arrangement 259 for using vapor pressure in vessel 16 for providing such pressure regulation is shown in phantom in FIG. 3. Arrangement 259 provides a separate flow path to compensate for excessive pressure drop due to reasons such as the length of the flow conduits and heat exchanger coils. Arrangement 259 includes a conduit 260 which taps an upper point of vessel 16, or conduit 31, and a pressure regulator valve 262 which regulates the pressure in the flow paths to a predetermined pressure, or which is controlled to a selected pressure by electrical control 70, as desired. A check valve 264 is illustrated, but may be unnecessary as the vapor pressure in vessel 16 should always be higher than the pressure at a flow path point. A valve 266 may also be added to conduit 260, which is controlled by electrical control 70. Conduit 260 may have a smaller opening diameter than the main flow conduits. As indicated in FIG. 3, the flow paths may be tapped and connected to the pressure maintaining arrangement 259 where necessary, such as indicated by the arrow heads at the ends of broken lines. In some instances, the pressure maintaining arrangement 259 may be combined with the flow path which includes conduit 240, to reduce piping, fittings and controls.

While not illustrated in the Figures, in order to prevent excessive pressures from building up when the refrigeration systems of the invention are shut down, a pressure relief valve should be added at any location where cryogen may be trapped between two valves at shut down.

Also, while not illustrated, it is to be understood that in transport applications blowers and/or fans driven by electrical motors powered by the vehicle electrical system, or other suitable source, may augment and/or replace the vapor motors, for moving air between the conditioned spaces and the associated heat exchangers. This is also applicable to stationary applications, with electrical mains being used to power electrical motors connected to fans and/or blowers. Also, in transport applications, the vapor motors may drive electrical generators or alternators for the purpose of charging batteries associated with the refrigeration system control 70.

We claim:

1. A method for controlling the temperature of a conditioned space comprising the steps of:
   providing a supply of cryogen which includes cryogen in a liquid state,
   providing a fluid flow path for the cryogen,
   providing heat exchanger means in the flow path,
   moving air from the conditioned space in heat exchange relation with the heat exchanger means,
   providing heating means in the flow path,
   heating the cryogen via the heating means in response to a predetermined condition,
   providing cryogen pre-heating means,
   vaporizing liquid cryogen via the pre-heating means to aid the heating step, and
   using cryogen heated by the heating step to aid the pre-heating step in adding heat to the cryogen, in response to a predetermined condition.

2. The method of claim 1 wherein the step of using heated cryogen to aid the vaporizing step includes the steps of taking cryogen from a point downstream from the heat exchanger means, and directing said cryogen to the pre-heating means.

3. The method of claim 1 including the steps of measuring the temperature of the cryogen downstream from the heat exchanger means to provide a first temperature, measuring the ambient temperature to provide a second temperature, and comparing the first and second temperatures, with a predetermined condition which triggers the use of heated cryogen to aid the vaporizing step being the first temperature exceeding the second temperature.

4. The method of claim 3 including the step of using ambient air to aid the vaporizing step when the first temperature does not exceed the second temperature.

5. The method of claim 1 including the step of providing vapor driven motor means in the flow path to implement the step of moving air from the conditioned space in heat exchange relation with the heat exchanger means, with the step of using heated cryogen to aid the vaporizing step using cryogen downstream from the vapor driven motor means.

6. The method of claim 5 including the steps of measuring the temperature of the cryogen downstream from the vapor driven motor means to provide a first temperature, measuring the ambient temperature to provide a second temperature, and comparing the first and second temperatures, with a predetermined condition which triggers the use of heated cryogen to aid the vaporizing step being the first temperature exceeding the second temperature.

7. The method of claim 6 including the step of using ambient air to aid the vaporizing step when the first temperature does not exceed the second temperature.

8. The method of claim 5 wherein the step of providing heating means in the flow path includes the step of locating the heating means downstream from the heat exchanger means and upstream from the vapor driven motor means.

9. The method of claim 8 including the step of detecting the need for increased air flow provided by the air moving step, and wherein a predetermined condition which triggers the heating of cryogen via the heating means is the detection of a need for increased air flow.

10. The method of claim 1 wherein the step of providing heating means in the flow path includes the step of locating the heating means upstream from the heat exchanger means.

11. The method of claim 1 including the step of detecting the need to defrost the heat exchanger means,
   and wherein a predetermined condition which triggers the heating of the cryogen via the heating means is the detection of a need to defrost the heat exchanger means.

12. The method of claim 1 including the step of conditioning the air of the conditioned space to a predetermined temperature band adjacent to a predetermined set point temperature, with a predetermined condition which triggers the heating of the cryogen via the heating means being the temperature of the conditioned space being below the predetermined temperature band.

13. A method for conditioning the air of a conditioned space, comprising the steps of:
   providing a supply of cryogen which includes cryogen in a liquid state,
   providing a flow path for the cryogen,
   providing heat exchanger means in said flow path,
   moving air from the conditioned space in heat exchange relation with the heat exchanger means,
   providing cryogen heating means in the flow path, with the cryogen heating means generating heated gases as a by-product,
   heating the cryogen via the heating means in response to a predetermined condition,
   providing pre-heating means,
   vaporizing liquid cryogen via the pre-heating means to aid the heating step,
   and using the heated gases generated by the heating step to aid the vaporizing step.

14. The method of claim 13 wherein the step of providing heating means in the flow path includes the step of locating the heating means upstream from the heat exchanger means.

15. The method of claim 14 including the step of detecting the need to defrost the heat exchanger means,
and wherein a predetermined condition which triggers the heating of the cryogen via the heating means is the detection of a need to defrost the heat exchanger means.

16. The method of claim 14 including the step of conditioning the air of the conditioned space to a predetermined temperature band adjacent to a predetermined set point temperature, with a predetermined condition which triggers the heating of the cryogen via the heating means being the temperature of the conditioned space being below the predetermined temperature band.

17. The method of claim 13 wherein the step of providing heating means in the flow path includes the step of locating the heating means downstream from the heat exchanger means, and including the steps of providing a vapor driven motor downstream from the heating means to aid in implementing the air moving step, detecting the need for increased air flow, and wherein a predetermined condition which triggers the heating of cryogen by the heating means is the detection of a need for increased air flow.

18. A refrigeration system for controlling the temperature of a conditioned space, including a supply of cryogen, a flow path for the cryogen, heat exchanger means in the flow path, means moving air from the conditioned space in heat exchange relation with the heat exchanger means, heating means in the flow path for heating the cryogen in response to a predetermined condition, and preheating means in the flow path for aiding the heating means, the improvement comprising:
means directing cryogen heated by the heating means in heat exchange relation with cryogen flowing through the pre-heating means, to aid the pre-heating means in adding heat to the cryogen in response to a predetermined condition.

19. The refrigeration system of claim 18 wherein the means which directs heated cryogen to aid the preheating means, directs cryogen from a point in the flow path located downstream from the heat exchanger means.

20. The refrigeration system of claim 18 including first sensor means for measuring the temperature of the cryogen downstream from the heat exchanger means to provide a first temperature, second sensor means for measuring the ambient temperature to provide a second temperature, and comparison means for comparing the first and second temperatures, with a predetermined condition which triggers the use of heated cryogen to aid the pre-heating means being the first temperature exceeding the second temperature.

21. The refrigeration system of claim 20 including means directing ambient air in heat exchange relation with the cryogen flowing through the pre-heating means, when the first temperature does not exceed the second temperature.

22. The refrigeration system of claim 21 wherein the pre-heating means includes first and second parallel cryogen flow paths respectively associated with the means for directing heated cryogen, and the means for directing ambient air, and means for selecting one of the first and second parallel paths in response to the comparison means.

23. The refrigeration system of claim 21 wherein the pre-heating means includes a single cryogen flow path surrounded by housing means having first and second selectable configurations responsive to the comparison means, with the first configuration resulting in a substantially closed housing for directing heated cryogen in heat exchange relation with the single cryogen flow path, and with the second configuration resulting in a substantially open housing for receiving ambient air.

24. The refrigeration system of claim 18 wherein the air moving means includes vapor driven motor means in the flow path located downstream from the heat exchanger means, with the means which directs heated cryogen to aid the pre-heating means, directing cryogen from a point in the flow path located downstream from the vapor driven motor means.

25. The refrigeration system of claim 24 including first sensor means for measuring the temperature of the cryogen downstream from the vapor driven motor means to provide a first temperature, second sensor means for measuring the ambient temperature to provide a second temperature, and comparison means for comparing the first and second temperatures, with a predetermined condition which triggers the use of heated cryogen to aid the preheating means being the first temperature exceeding the second temperature.

26. The refrigeration system of claim 25 including means for directing ambient air in heat exchange relation with the cryogen flowing through the pre-heating means when the first temperature does not exceed the second temperature, to aid the pre-heating means.

27. The refrigeration system of claim 26 wherein the pre-heating means includes first and second parallel cryogen flow paths respectively associated with the means for directing heated cryogen, and the means for directing ambient air, and means for selecting one of the first and second parallel paths in response to the comparison means.

28. The refrigeration system of claim 26 wherein the pre-heating means includes a single cryogen flow path surrounded by housing means having first and second selectable configurations responsive to the comparison means, with the first configuration resulting in a substantially closed housing for directing heated cryogen in heat exchange relation with the single cryogen flow path, and with the second configuration resulting in a substantially open housing for receiving ambient air.

29. The refrigeration system of claim 24 wherein the heating means is disposed in the flow path downstream from the heat exchanger means and upstream from the vapor driven motor means.

30. The refrigeration system of claim 29 including means detecting the need for increased air flow, and wherein a predetermined condition which triggers the heating of cryogen by the heating means is the detection of a need for increased air flow.

31. The refrigeration system of claim 18 including means detecting the need to defrost the heat exchanger means,
and wherein a predetermined condition which triggers the heating of the cryogen via the heating means is the detection of a need to defrost the heat exchanger means.

32. The refrigeration system of claim 18 including means for conditioning the air of the conditioned space to a predetermined temperature band adjacent to a predetermined set point temperature, with a predetermined condition which triggers the heating of the cryogen via the heating means being the temperature of the conditioned space being below the predetermined temperature band.

33. The refrigeration system of claim 18 wherein the heating means is disposed in the flow path upstream from the heat exchanger means.

34. A refrigeration system for controlling the temperature of a conditioned space, including a supply of cryogen, a flow path for the cryogen, heat exchanger means in the flow path, means for moving air from the conditioned space in heat exchange relation with the heat exchanger means, cryogen heating means in the flow path which heats the cryogen in response to a predetermined condition and generates heated gases as a by-product, and pre-heating means for aiding the heating step, the improvement comprising:

means directing heated gases generated by the heating step in heat exchange relation with the cryogen flowing through the pre-heating means, to aid the preheating means in adding heat to the cryogen.

35. The refrigeration system of claim 34 wherein the heating means is located in the flow path upstream from the heat exchanger means.

36. The refrigeration system of claim 35 including means detecting the need to defrost the heat exchanger means, with a predetermined condition which triggers the heating of the cryogen via the heating means being the detection of a need to defrost the heat exchanger means.

37. The refrigeration system of claim 35 including means conditioning the air of the conditioned space to a predetermined temperature band adjacent to a predetermined set point temperature, with a predetermined condition which triggers the heating of the cryogen via the heating means being the temperature of the conditioned space being below the predetermined temperature band.

38. A refrigeration system for controlling the temperature of a conditioned space and producing by-product heat in the process, with the refrigeration system including a supply of cryogen which includes cryogen in a liquid state, a fluid flow path for the cryogen, heat exchanger means in the flow path, air mover means for moving air from the conditioned space in heat exchange relation with the heat exchanger means, and vaporizing means for vaporizing liquid cryogen, with the air moving means utilizing cryogen vaporized by the vaporizing means, the improvement comprising:

means directing said by-product heat, produced during the conditioning of the conditioned space, in heat exchange relation with the vaporizing means.

39. The refrigeration system of claim 38 wherein the by-product heat utilized by the vaporizing means includes cryogen taken from a point in the cryogen fluid flow path downstream from the heat exchanger means.

40. The refrigeration system of claim 38 including means for heating the cryogen which produces hot gases, and wherein by-product heat utilized by the vaporizing means includes said hot gases.

* * * * *